P. T. SIEVERT.
ELECTROMAGNETIC CARRIER FOR GLASS BODIES.
APPLICATION FILED JAN. 14, 1910.
1,035,390. Patented Aug. 13, 1912.
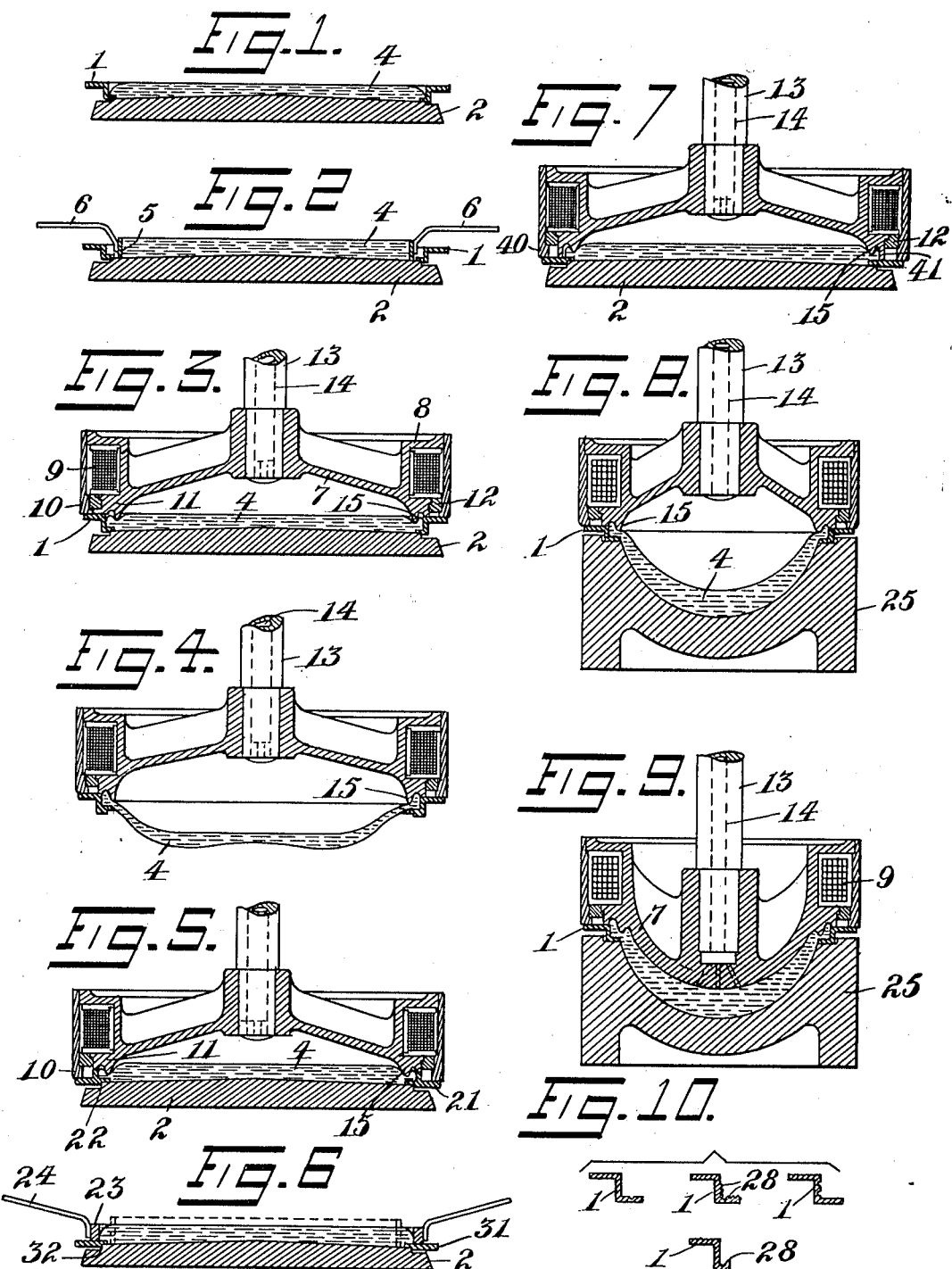

UNITED STATES PATENT OFFICE.

PAUL THEODOR SIEVERT, OF DRESDEN, GERMANY.

ELECTROMAGNETIC CARRIER FOR GLASS BODIES.

1,035,390.  Specification of Letters Patent.  Patented Aug. 13, 1912.

Application filed January 14, 1910. Serial No. 538,109.

*To all whom it may concern:*

Be it known that I, PAUL THEODOR SIEVERT, manufacturer, a subject of the Emperor of Germany, residing at Nürnbergerstrasse 46, Dresden, Germany, have invented certain new and useful Improvements in or Relating to Electromagnetic Carriers for Glass Bodies, of which the following is a specification.

My invention relates to devices for electromagnetically securing carriers with layers of glass or previously-shaped glass bodies which are to be worked up. Heretofore I have proposed laying hold of layers of glass or previously-shaped glass bodies, which are to be expanded to form larger hollow bodies by sinking them into or raising the same out of a heating-chamber and possibly rotating them around their axes and blowing in compressed air, by means of an electromagnetic carrier moved by the machine, in order to finish them in the manner referred to and then detach them from the carrier.

A primary object of my invention is to provide improved electromagnetic devices for this mode of operation.

According to my invention I connect the layer of glass or the previously-shaped glass body with an iron carrying-frame which carries the glass body at its edge lying on a part of the carrying-frame. I provide this frame with a vertical limit face which gives a quite definite form to the outflowing glass mass or to the glass body during the pressing operation, or which when the previously-shaped glass body is already cooled serves for centering the same. The limiting face may either be secured on the carrying-frame or be placed on the frame only when pouring in the glass mass or placing in position the previously-shaped glass body and afterward removed again. The electromagnet which is then to be placed thereon lays hold of the frame as its armature and firmly clamps the edge of the glass body against the carrying-frame by means of a special ring of nose-like section in this manner guaranteeing a certain hold.

The principal advantage of my present arrangement as compared with my former disclosures is that of being able to keep very small the edge which serves for carrying the glass body and lies on the carrying-frame, and, with a smaller thickness of the top rim of the hollow body, to keep this absolutely constant.

Some illustrative embodiments of my invention are represented by way of example in the accompanying drawings, wherein:—

Figure 1 shows in section the improved ring on a mold plate with a glass mass thereon; Fig. 2 is a similar view showing the special ring; Fig. 3 is a similar view showing the use of the electro-magnetic carrier; Fig. 4 is a view similar to Fig. 3, showing a later stage in the operation; Fig. 5 shows another form of carrying frame; Fig. 6 shows another form of carrying frame with the special ring in position; Fig. 7 shows the parts of the latter figure with the electro-magnet engaging the ring; Figs. 8 and 9 show the carrying frame with the use of a mold block; and Fig. 10 shows ribs 28 on the ring frame.

Referring firstly to Figs. 1 to 5, as carrying-frame I employ a flat, cast ring 1 having a ⌐-shaped section and consisting of two horizontal limbs or members at different heights and a connecting vertical member. This carrying-frame is placed on a mold plate 2 shown in the drawings (Figs. 1 and 2) as being curved upwardly somewhat, which may however be plain or concavous shaped and preferably rests on a car or truck 3. The glass mass 4 is then poured in so that it rests with its edge on the bottom horizontal part of the carrying-frame 1.

According to the arrangement shown in Fig. 2, I may place within carrying-frame 1 an additional special ring 5 having handles 6, and then pour the glass mass 4 into this ring; after the glass has cooled somewhat ring 6 is removed, whereupon the glass flows, as shown in Fig. 1, and lies with its edge on the bottom member of ring 1. The electromagnet is then placed on carrying-frame 1, as shown in Fig. 3. It preferably consists of a blowing-pipe head 7 having an annular casing 8 containing the winding 9 and having two circular poles 10 and 11 magnetically separated by an insulating ring 12. The magnet is secured to a shaft or rod 13 connected with the machine and, in general, is provided with a duct 14 for introducing compressed air or other pressure medium.

Adjacent pole 11 in casing 8 I provide a rim 15 of nose-like section. When the magnet is placed on the still plastic layer of glass, in order to lay hold of the top horizontal member of carrying-frame 1 as armature with its poles 10 and 11 ring 15 is pressed into the surface of the layer of glass, and when shaft 13 is now raised the layer of glass is clamped between the bottom inner member of ring 1 and ring 15, held fast and carried upward. It now sinks, as Fig. 4 shows, under the action of its own weight or owing to the pressure of the fluid blown in through duct 14 and is shaped further in well-known manner.

It will be readily understood how securely the layer of glass is taken hold of by a carrying-frame of the described type and how scanty the rim may be by which it is held. It is also obvious that the thickness of wall at this top part of the forming glass body becomes perfectly uniform and also very thin, because owing to the vertical member of the carrying ring the flow of the glass when being poured in is limited exactly.

Fig. 5 shows a somewhat modified form of my carrying frame 21. This is here ⌊-shaped and preferably has in its bottom face a small recess 22 in order that it may be placed exactly centrically on the mold plate 2. The outer annular pole 10 of the electromagnet is made so much longer than the inner annular pole 11 that when the electromagnet is positioned both the poles contact with the carrying-frame 21, the outer pole 10 contacting with the outer horizontal member of the frame and the inner pole 11 with the vertical member which when the layer of glass is poured in limits the flow of the same.

Fig. 5 shows another modified form of my carrying-frame which here consists of one single flat ring 31 preferably recessed at 32 for placing it on the mold plate 2; the flow of the layer of glass is limited, after it has been poured in, by a special ring 23 which is put in position only while glass is being poured into frame 1 and can be removed by means of handles 24 after the layer of glass has stiffened. Dotted lines show how the glass may be poured in by previously using an additional ring 5 which is removed when the glass is still so plastic that it flows outwardly and lies over the edge of the carrying-frame or ring 1.

Fig. 7 shows how the electromagnet is placed on a carrying-frame as last described. The poles 40 and 41 of the electromagnet are at an equal height but are preferably somewhat longer than in the form shown in Figs. 1 to 5.

Figs. 8 and 9 show such a carrying-frame in use with a previously-shaped glass body. The body is placed or pressed in while its edges are still plastic to a certain degree. If the glass body previously-shaped by well-known devices is placed into the ring in order to be clamped in the same, the vertical part of the ring serves, whether it be fixed or detachable, for exactly centering the still soft glass edges and for laterally supporting the glass when ring 15 is forced in.

I prefer to force the previously-shaped glass body directly into ring 1 and then to place this ring together with the previously-shaped glass body on a mold plate 25 adapted to the shape of the glass body, from which plate it is subsequently lifted by the electromagnet, as shown in Fig. 9. The mold plate 25 could also simultaneously be the mold. In order to diminish the number of manipulations, however, I may go a step farther and form the blowing-pipe head 7 as a press-ram with which previously to shape the glass body and force it into ring 1 and into mold 25.

It is obvious that the magnetic circuit of the two annular poles of the electromagnet is always closed by the carrying-frame 1 itself.

Ribs, etc., may be provided for at any part of the carrying frame 1, as instanced in Fig. 10, to improve cooling and adhering of the glass edge.

I claim:—

1. In means for electromagnetically laying hold of layers of glass or previously-shaped glass bodies which are to be shaped further, the combination, with an electromagnetic carrier having two annular poles, of a carrying-frame, supporting a glass mass at the edges thereof, forming the armature of said carrier and having a vertical limit ring for limiting the flow of the glass mass and giving the same a regular shape, said carrier having a projecting annular rim of nose-like section adapted to be pressed into the surface of the glass mass when the carrier attracts the carrying-frame.

2. In means for electromagnetically laying hold of layers of glass or previously-shaped glass bodies which are to be shaped further, the combination of an electromagnetic carrier having two annular poles and an inner annular downwardly-projecting rim, a circular carrying-frame having two horizontal members and one vertical limit member connecting together the latter, the top horizontal member directly contacting with said poles, whereby a glass body resting on the bottom horizontal member is clamped against the same by said rim, substantially as shown.

In witness whereof I have hereunto signed my name in the presence of two subscribing witnesses.

PAUL THEODOR SIEVERT.

Witnesses:
 SCHWESTER ELSE BUDOCH,
 PAUL ARRAS.